United States Patent [19]

Shimizu et al.

[11] Patent Number: 4,771,341
[45] Date of Patent: Sep. 13, 1988

[54] VIDEO SIGNAL RECORDING AND REPRODUCING APPARATUS WITH A COMB FILTER FOR REMOVING CHROMINANCE COMPONENTS

[75] Inventors: Masayuki Shimizu, Tokyo; Yasutoshi Matsuo, Kawasaki, both of Japan

[73] Assignee: Victor Company of Japan, Limited, Yokohama, Japan

[21] Appl. No.: 863,746

[22] Filed: May 15, 1986

[30] Foreign Application Priority Data

May 20, 1985 [JP] Japan ............................ 60-74341[U]

[51] Int. Cl.$^4$ ............................................. H04N 9/87
[52] U.S. Cl. .................................................... 358/329
[58] Field of Search ............... 358/310, 330, 327, 328, 358/329

[56] References Cited

U.S. PATENT DOCUMENTS

| | | | |
|---|---|---|---|
| 4,003,079 | 1/1977 | Woo | 358/329 |
| 4,157,565 | 6/1979 | Kuniyoshi et al. | 358/329 |
| 4,242,699 | 12/1980 | Kobayashi et al. | 358/329 |
| 4,524,380 | 6/1985 | Shibata et al. | 358/329 |

Primary Examiner—Donald McElheny, Jr.
Attorney, Agent, or Firm—Jordan and Hamburg

[57] ABSTRACT

A video signal recording and playback apparatus in which in a record mode operation a frequency-modulated luminance signal and a carrier chrominance signal whose frequency has been converted to a one lower than that of the luminance signal are written superposed on each other in a magnetic recording medium and, in a playback mode operation, the signal read out of the recording medium is separated into a reproduced color signal and a reproduced luminance signal, then the two reproduced signals are subjected to predetermined signal processing by individual signal processing systems, and then the processed signals are mixed by a mixer to produce a reproduced color video signal. The mixer to which the reproduced luminance signal is applied is preceded by a comb filter which is operable using a chrominance subcarrier frequency of the reproduced chrominance signal as a reference.

2 Claims, 8 Drawing Sheets

VIDEO SIGNAL RECORDING AND REPRODUCING APPARATUS WITH A COMB FILTER FOR REMOVING CHROMINANCE COMPONENTS

BACKGROUND OF THE INVENTION

The present invention relates to an apparatus for recording and reproducing video signals. More particularly, the present invention is concerned with a video signal recording and reproducing apparatus of the type, in a record mode operation, writing in a magnetic recording medium a frequency-modulated luminance signal together with a carrier chrominance signal having a frequency converted to a lower one than that of the luminance signal while, in a playback mode operation, reading them out by the opposite signal processing to the record mode operation.

In a video signal recording and reproducing apparatus of the type described, while time base fluctuation components contained in a carrier chrominance signal are removed during playback, a luminance signal reproduced still contains time base fluctuation components such as a difference in tape speed between recording and playback and jitters. When the reproduced chrominance signal and luminance signals are mixed together in a playback system, they interfere with each other, disturbing their accurate interleaved relation from being set up. Such makes it impossible in the apparatus design to extend the frequency band of the luminance signal in order to achieve high quality performance of the video signal recording and reproducing apparatus.

SUMMARY OF THE INVENTION

It is therefore an object of the present invention to provide a video signal recording and reproducing apparatus capable of recording and reproducing video signals with good quality.

It is another object of the present invention to provide a video signal recording and reproducing apparatus which eliminates interference between a reproduced luminance signal and a reproduced chrominance signal due to time base fluctuation components which are contained in the luminance signal, thereby realizing an adequate interleaved relation between the luminance and the chrominance signals.

It is another object of the present invention to provide a generally improved video signal recording and reproducing apparatus.

An apparatus for recording a video information signal in and reproducing the signal from a magnetic recording medium of the present invention comprises a video signal recording circuit for separating an input video signal into a luminance signal and a carrier chrominance signal, and then combining a luminance signal which has undergone frequency modulation and a carrier chrominance signal a frequency of which has been converted to a frequency lower than a frequency of the luminance signal to record the luminance signal and the carrier chrominance signal in the recording medium, a reproduced signal processing circuit for separating a signal reproduced from the recording medium into a reproduced luminance signal and a reproduced chrominance signal and for subjecting the reproduced signals to predetermined reproduced signal processing, a mixing circuit for mixing the reproduced luminance signal and the reproduced chrominance signal subjected to the signal processing, and a comb filter positioned before the mixing circuit for removing signal components from the reproduced luminance signal outputted by the processing means, the frequencies of the signal components corresponding to a frequency spectrum of the reproduced chrominance signal outputted by the processing means.

The above and other objects, features and advantages of the present invention will become more apparent from the following detailed description taken with the accompanying drawings.

DESCRIPTION OF THE PREFERRED EMBODIMENTS

While the video signal recording and reproducing apparatus of the present invention is susceptible of numerous physical embodiments, depending upon the environment and requirements of use, substantial numbers of the herein shown and described embodiments have been made, tested and used, and all have performed in an eminently satisfactory manner.

To better understand the present invention, a brief reference will be made to a prior art video signal recording and reproducing apparatus, shown in FIG. 1. The prior art apparatus, generally 10, has an input terminal 12 to which a color video signal in, for example, an NTSC (National Television Systems Committee) format is applied during record mode operation. The color video signal is fed from the input terminal 12 to a comb filter 16 via a record contact R of a record/-playback switch 14, whereby a luminance signal Sy and a carrier chrominance signal Sc are separated from each other. The signal Sc has a chrominance subcarrier frequency fc of about 3.58 megahertz. The luminance signal Sy is routed through a low pass filter (LPF) 18, an automatic gain control (AGC) circuit 20 and a pre-emphasis circuit 22 to a frequency modulator 24, the output of which is a record frequency-modulated (FM) signal Sf. The signal Sf is applied to a mixer 28 via a high pass filter (HPF) 26.

Meanwhile, the carrier chrominance signal Sc is fed to a frequency converter 36 by way of a bandpass filter (BPF) 30 whose passband lies within the range of chrominance subcarrier frequency fc ±500 kilohertz, a record contact R of a record/playback switch 32, and an automatic chromaticity control (ACC) circuit 34. An automatic frequency control (AFC)-automatic phase control (APC) type oscillator 38 supplies the frequency converter 36 with an alternating signal Sa having a frequency fa (where $fa=fc+fs$; fs being 688 kilohertz, for example). The frequency converter 36, therefore, converts the carrier chrominance Sc to a carrier chrominance signal Ss whose carrier frequency is fs, i.e. the difference between the chrominance subcarrier frequency fc and the oscillation frequency fa of the oscillator 38. The output of the frequency converter 36 which has undergone frequency conversion is passed through an LPF 40 to the mixer 28.

To remove intertrack crosstalk components which may appear during reproduction of the carrier chrominance signal, as will be described, the phase of the alternating signal Sa is advanced (or shifted forwardly) 90 degrees for each 1H (one horizontal scanning period) during recording a certain track and delayed (or shifted backwardly) 90 degrees for each 1H during recording the next track; the forward and the backward phase shifts are repeated alternately with each other. Conversion of the frequency of a carrier chrominance signal to a lower one by such an alternating signal and reconversion from the lower frequency to the original one during playback are described in detail in, for example, U.S. Pat. No. 4,178,606 and will not be described any further herein.

The mixer 28 produces a signal Sw in which the record FM luminance signal Sf is distributed in a higher frequency side and the carrier chrominance signal Ss is a lower frequency side. The signal Sw is amplified by a record amplifier 42 up to a predetermined level necessary for recording. The output of the amplifier 42 is fed as a record signal to rotary heads 46a and 46b via a record contact R of a record/playback switch 44. As a result, the signal Sw is sequentially recorded in a magnetic tape 48 as, for example, inclined recording tacks one for each field. The nearby tracks on the tape 48 have different azimuth angles from each other and contact or overlap along their edges. This kind of recording is generally referred to as azimuth recording.

Figure 1:
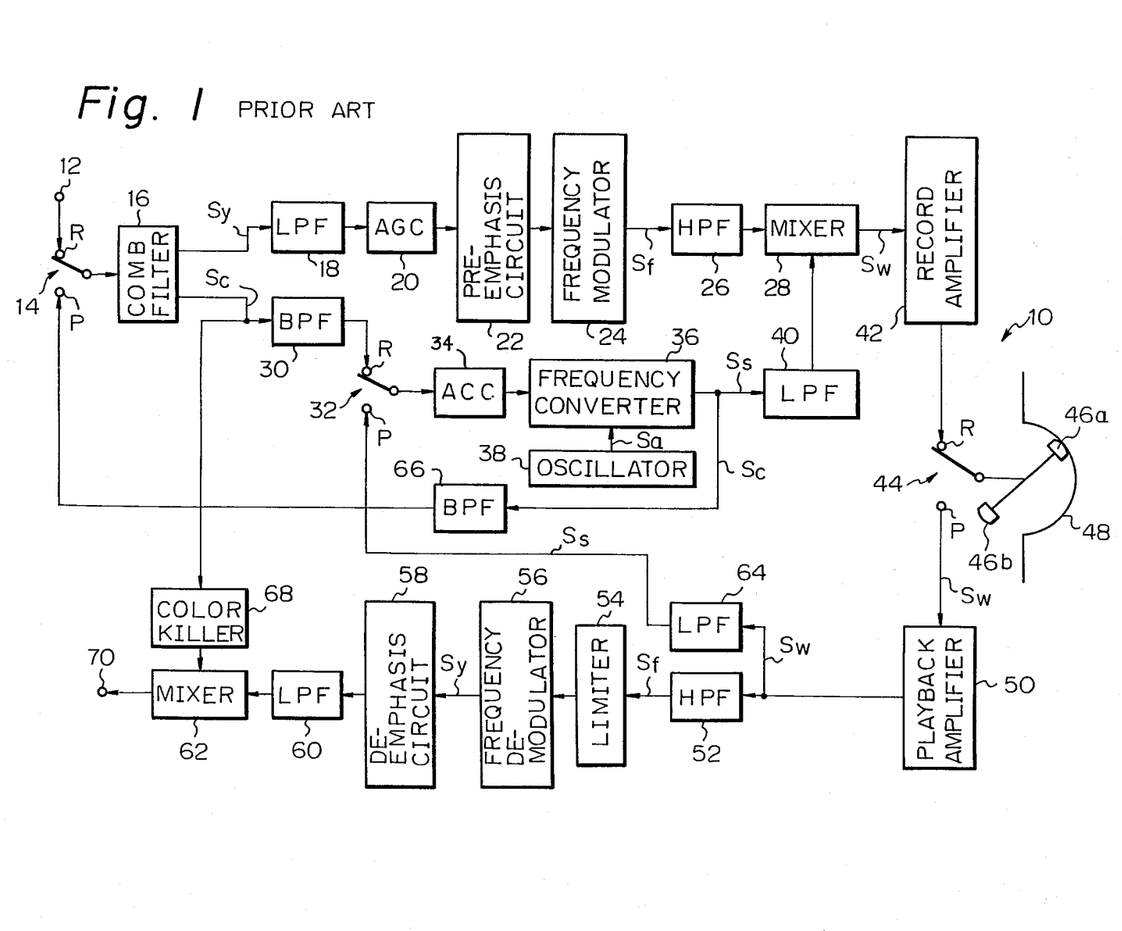
FIG. 1 is a block diagram of a prior art video signal recording and reproducing apparatus.
Figure 2:
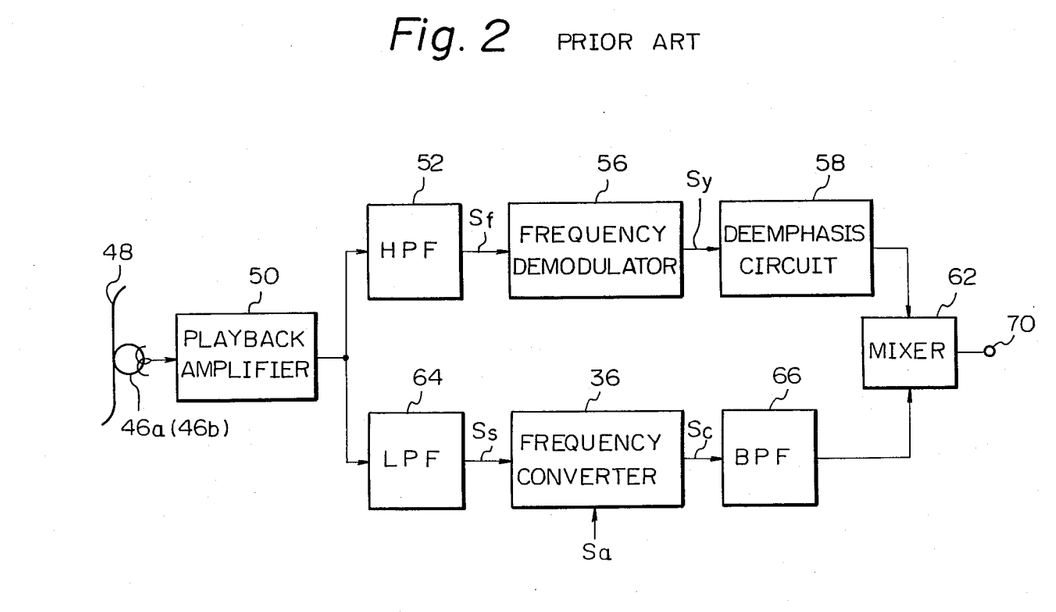
FIG. 2 is a block diagram showing a playback system which is included in the apparatus of FIG. 1.

As shown in FIGS. 1 and 2, during playback mode oepration, the heads 46a and 46b reproduce the signal Sw out of the tape 48. The signal Sw is routed through a playback contact P of the switch 44 (not shown in FIG. 2) to a playback amplifier 50 to be thereby amplified to a predetermined level. The output of the amplifier 50 is applied to a high pass filter (HPF) 52 which then separates a reproduced FM luminance signal Sf. This signal Sf is delivered through a limiter 54 (not shown in FIG. 2) to a frequency demodulator 56 to become a reproduced luminance signal Sy, the signal Sy being passed through a deemphasis circuit 58 and an LPF 60 (not shown in FIG. 2) to a mixer 62.

The signal Sw from the amplifier 50 is also routed to an LPF 64 to separate a reproduced carrier chrominance signal Ss. The signal Ss is routed through a playback contact P of the switch 32 (not shown in FIG. 2) and the ACC 34 (not shown in FIG. 2) to the frequency converter 36 and restored thereby to the original carrier chrominance signal Sc having the frequency fc responsive to the output Sa (frequency fa) of the oscillator 38 (not shown in FIG. 2). The signal Sc is fed through a BPF 66 (whose passband is substantially the same as that of the BPF 30) and then a playback contact P of the switch 14 (not shown in FIG. 2) to the comb filter 16 (not shown in FIG. 2). Freed from intertrack crosstalk components by the filter 16, the carrier chrominance signal Sc is delivered through a color killer circuit 68 (not shown in FIG. 2) to the mixer 62. The mixer 62 mixes the reproduced luminance signal Sy and the reproduced carrier chrominance signal Sc, so that the color video signal in an NTSC format is delivered through an output terminal 70.

The conversion-to-lower frequency type prior art apparatus 10 records and reproduces color video signals in the above-described manner.

In the prior art apparatus 10, it has been customary to cause the previously mentioned LPFs to attenuate substantial proportions of those luminance signal components which are close to and higher than the chrominance subcarrier frequency fc where much of spectral energy of the carrier chrominance signal is distributed, in order that interference between the reproduced luminance signal and the reproduced chrominance signal may be prevented from occuring. However, this brings about a problem where the passbands of the LPFs are extended or the LPFs are omitted with the intention of enhancing the resolution.

Specifically, in the chrominance signal reproducing system of the apparatus 10 which extends from the LPF 64 to the color killer 68 as shown in FIGS. 1 and 2, the carrier chrominance signal is frequency-converted by the frequency converter 36 responsive to the output Sa (frequency fa) of the AFC-APC oscillator 38 to be provided with a predetermined chrominance subcarrier frequency (3.58 megahertz) and a predetermined phase, the resultant reproduced carrier chrominance signal Sc which is free from time base fluctuation components being fed to the mixer 62. Meanwhile, in the luminance signal reproducing system which extends from the HPF 52 to the LPF 60, the reproduced luminance signal processed by the system contains time base fluctuation components as typified by a difference between the recording speed and the playback speed of the tape 48 and jitters. Hence, simply applying the reproduced luminance signal to the mixer 62 to mix it with the reproduced chrominance signal would cause interference to occur between the two signals, preventing an adequate interleaved relation from being achieved. Even a comb filter adapted to cancel crosstalk of reproduced chrominance signals fails to remove time base fluctuation components of the above-stated nature.

Figure 3A:
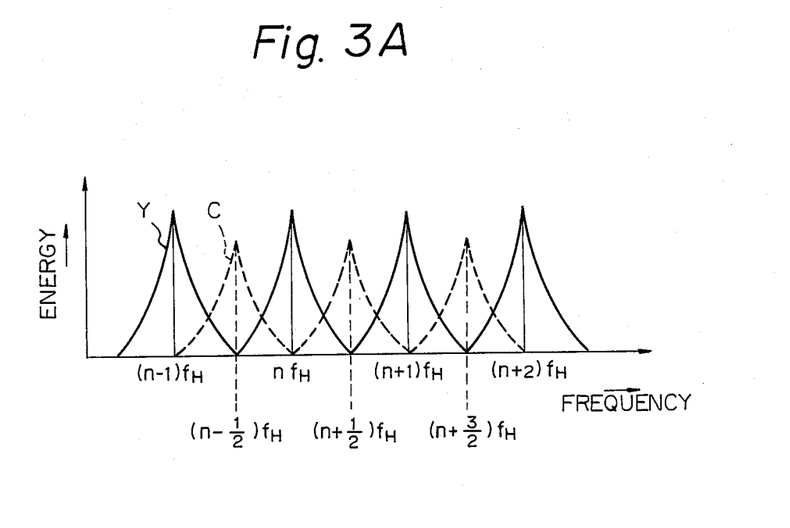
FIGS. 3A and 3B are plots representative of an interleaved relation between a reproduced luminance signal and a reproduced carrier chrominance signal.

So long as the reproduced luminance signal is free from time base fluctuation components, it repeatedly appears for every fH (horizontal scanning frequency); in the event of frequency conversion of the reproduced chrominance signal which is adapted to superpose it on the reproduced luminance signal, setting the converted chrominance subcarrier frequency fc at $(n+\frac{1}{2})$ fH will allow the frequency distribution of the reproduced chrominance signal to be interleaved in that of the reproduced luminance signal, i.e., an adequate interleaved will be set up between the two signals, as shown in FIG. 3A. However, since an actual reproduced luminance signal contains time base fluctuation components, mixing the chrominance signal without fluctuation components and the luminance signal with fluctuation components allows the fluctuation components (reproduced luminance signal) and the reproduced chrominance signal to interfere with each other. This causes the reproduced luminance signal to overlap with the frequency band of the chrominance subcarrier signal as shown in FIG. 3B, failing to set up the adequate interleaving.

Figure 3B:
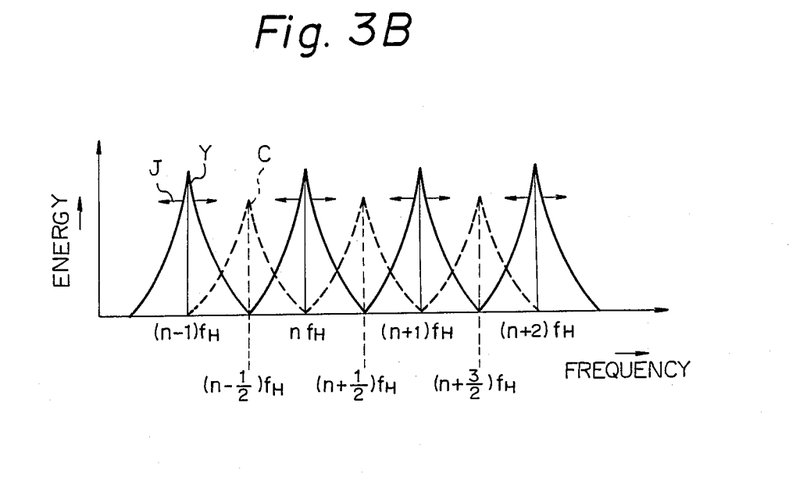

In FIGS. 3A and 3B, C designates the chrominance signal component. Y the luminance signal components, and J the jitter component (time base fluctuation component). The coordinate represents the energy level and the abscissa, the frequency.

In the apparatus 10, since the interference occurring between the luminance signal and the chrominance signal as discussed above is detrimental to the quality of reproduced pictures, the frequency band of the luminance signal must be limited. That is, the frequency band of the luminance signal and, therefore, the quality of pictures recorded and reproduced cannot be enhanced beyond a certain limit.

The present invention proposes a video signal recording and reproducing apparatus which is free from the problem as discussed hereinabove.

In a reproduced luminance signal, it is those portions thereof which overlap with the frequency of chrominance subcarrier that are critical with regard to the interleaved relation with a reproduced chrominance signal. With this in mind, the present invention processes a reproduced luminance signal by use of a comb filter to attenuate the $(n+\frac{1}{2})$ fH component of the (spectrum of the) luminance signal, thereby allowing a reproduced chrominance signal to be interleaved in the luminance signal. In this instance, since a reproduced chrominance signal is free from time base fluctuation components but not a reproduced luminance signal, removing the $(n+\frac{1}{2})$ fH component from the reproduced luminance signal on the basis of the reproduced luminance signal itself is ineffective to adequately interleave a reproduced chrominance signal in a reproduced luminance signal.

In light of the above, the present invention has contemplated to remove the $(n+\frac{1}{2})$ component using a reproduced chrominance signal which is free from time base fluctuation as a reference. Such is implemented with a comb filter with a 1H delay which is operable based on the chrominance subcarrier frequency fc.

Figure 4:
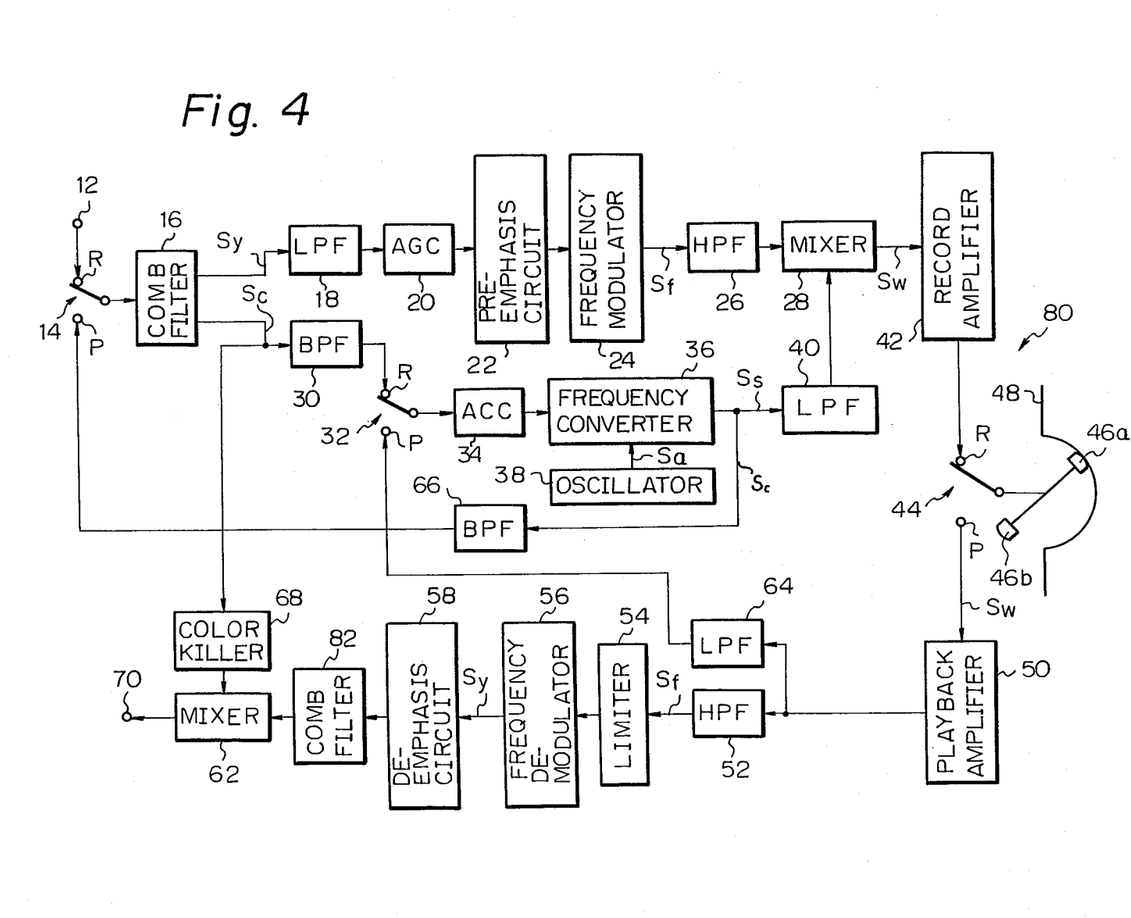
FIG. 4 is a block diagram of a video signal recording and reproducing apparatus in accordance with the present invention.
Figure 5:
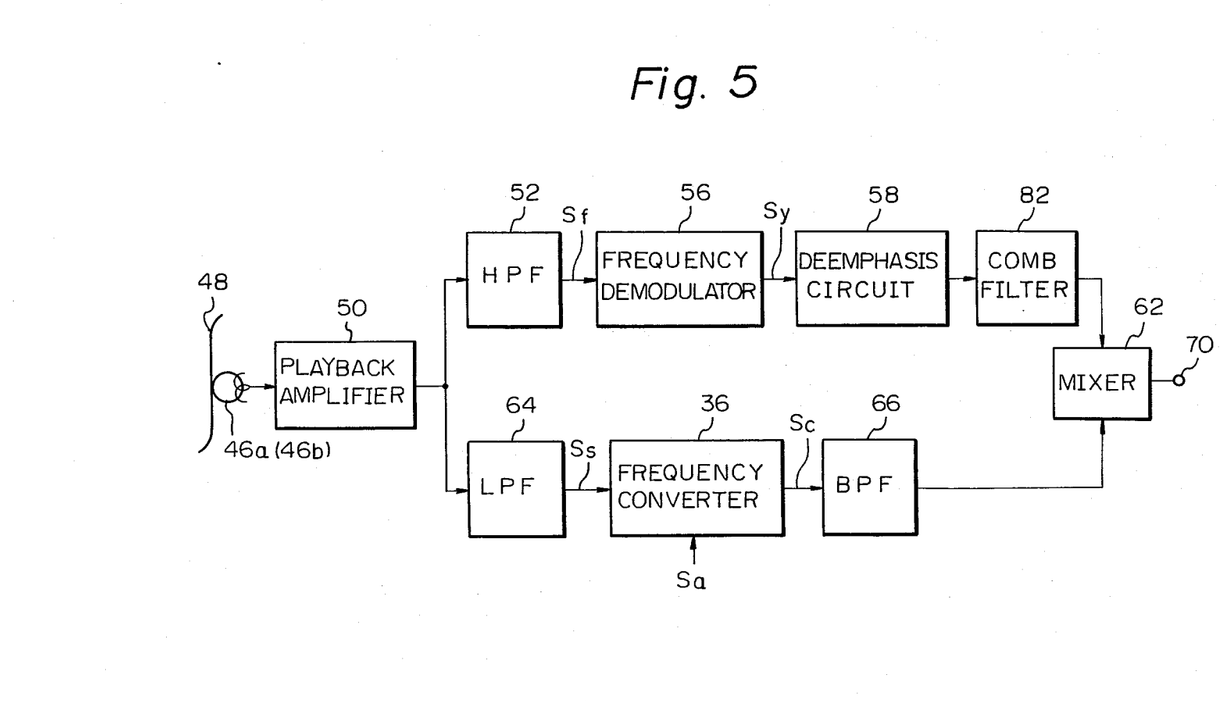
FIG. 5 is a block diagram of a playback system forming a part of the apparatus of FIG. 4.
Figure 6:
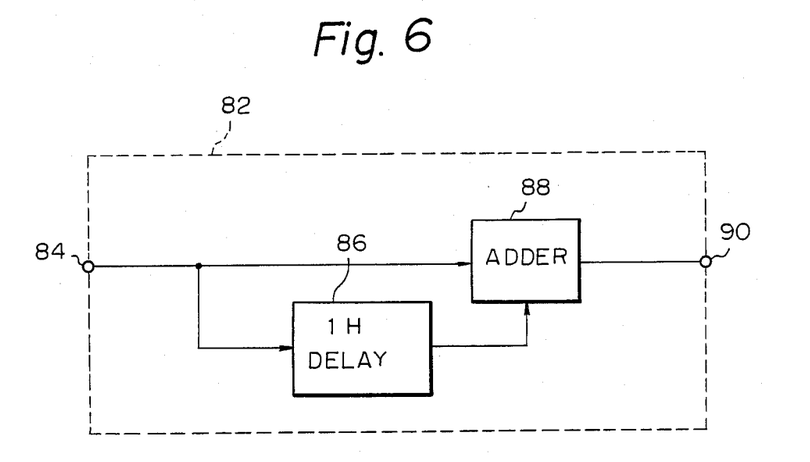
FIGS. 6 and 7 are block diagrams showing specific constructions of a comb filter which is shown in FIGS. 4 and 5.
Figure 7:
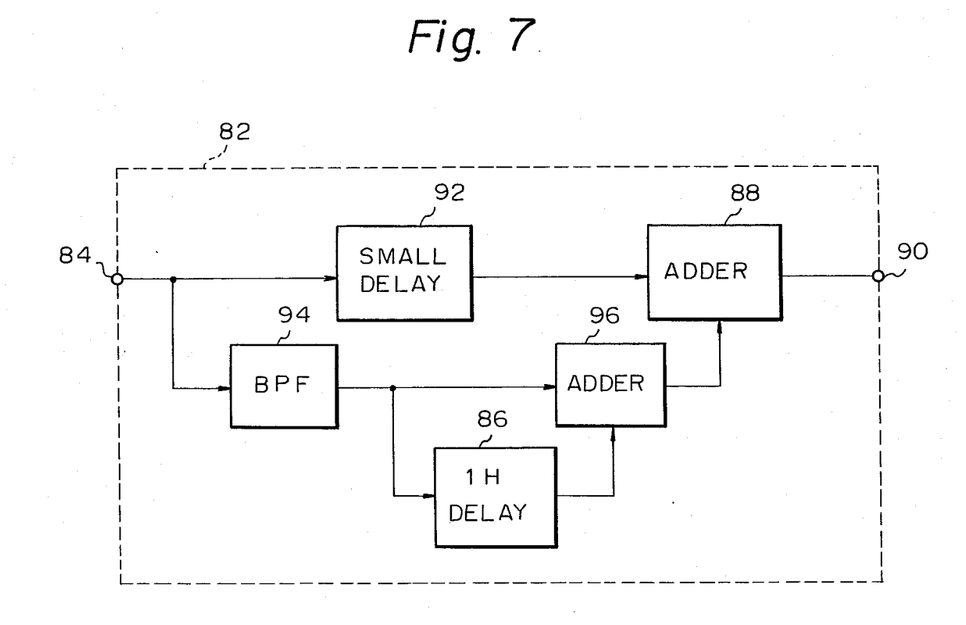
Figure 8:
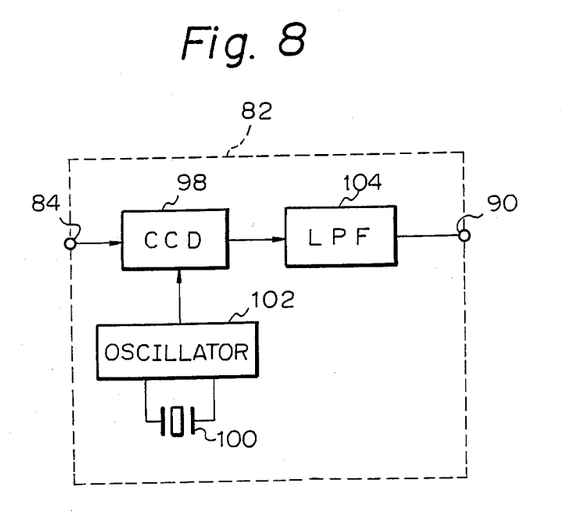
FIG. 8 is a block diagram of a comb filter which is implemented with a charge coupled device.

Referring to FIG. 4, a video signal recording and reproducing apparatus embodying the present invention is shown. A playback system forming a part of the apparatus is shown in FIG. 5. Further, specific constructions of a comb filter which are applicable to the apparatus of FIG. 4 are shown in FIGS. 6 to 8. In FIGS. 4 to 8, the same structural elements as those of FIGS. 1 and 2 are designated by like reference numerals and description thereof will be omitted to avoid redundancy.

As shown in FIGS. 4 and 5, an apparatus 80 of the present invention includes a comb filter 82 which is interposed between a deemphasis circuit 58 and a mixer 62 of a luminance signal reproducing section. The comb filter 82 is operable using the chrominance subcarrier frequency fc as a reference. It is to be noted that the comb filter 82 may be located in any other desired position insofar as it is after a frequency demodulator 56 and before the mixer 62.

In a specific construction of the comb filter 82 as shown in FIG. 6, a reproduced luminance signal applied to an input terminal 84 is delivered to a 1H delay circuit 86 such as a glass delay line, and one input terminal of an adder 88. The 1H-delayed output (reproduced luminance signal) of the circuit 86 is fed to the other input terminal of the adder 88 to be added to the reproduced luminance signal. The output of the adder 88 which appears at an output terminal 90 is applied to the mixer 62. Then, the comb filter 82 of the previously stated nature attenuates the $(n+\frac{1}{2})$ fH component of the incoming reproduced luminance signal, thereby producing a reproduced luminance signal which allows a reproduced chrominance signal to be adequately interleaved therein.

The comb filter 82 shown in FIG. 6 is applicable to a case wherein vertical correlation exists. Where vertical correlation is negligible, a comb filter constructed as shown in FIG. 7 may be used.

Specifically, in the comb filter 82 of FIG. 7, a reproduced luminance signal coming in through the input terminal 84 is fed to a small delay circuit 92 and a BPF 94. The output (reproduced luminance signal) of the BPF 94 is routed to one input terminal of an adder 96 and the 1H delay circuit 86. The delayed output (reproduced luminance signal) of the 1H delay 86 is applied to the other input terminal of the adder 96 to be added to the reproduced luminance signal from the BPF 94. The summation output of the adder 96 is fed to one input terminal of the adder 88. The output (reproduced luminance signal) of the delay circuit 92 which has been delayed by a small amount which may be 200 to 600 ns comparable to the delay time of the BPF 94 is applied to the other input terminal of the adder 88 to be added to the output of the adder 96. Hence, a reproduced color signal appearing at the output terminal 90 is turned by the comb filter 82 into a reproduced luminance signal whose $(n+\frac{1}{2})$ fH component has been attenuated. Such allows a reproduced chrominance signal to be desirably interleaved in the reproduced luminance signal.

The 1H delay circuit as shown in FIGS. 6 or 7 is not limited to a glass delay line. For example, as shown in FIG. 8, it may comprise a charge coupled device (CCD) 98 and an oscillator 102 which is implemented with a quartz 100. Clock pulses which are oscillated by the oscillator 102 based on the chrominance subcarrier frequency fc of a reproduced chrominance signal are applied to the CCD 98 to drive it, the output of the CCD 98 being fed to the output terminal 90 via an LPF 104. In this instance, assuming that the CCD 98 is a 910-step CCD, the oscillation frequency fo of the quartz 100 is expressed as:

$$fo = 910\,fH$$

$$fH = (2/455)fc.$$

Therefore, the frequency fo is produced by:

$$fo = 4fc \approx 14.3 \text{ (megahertz)}$$

In practice, since the LPF 104 has a group delay time, it is necessary to select the oscillation frequency fo of the quartz 100 in due consideration of the group delay time.

Figure 9:
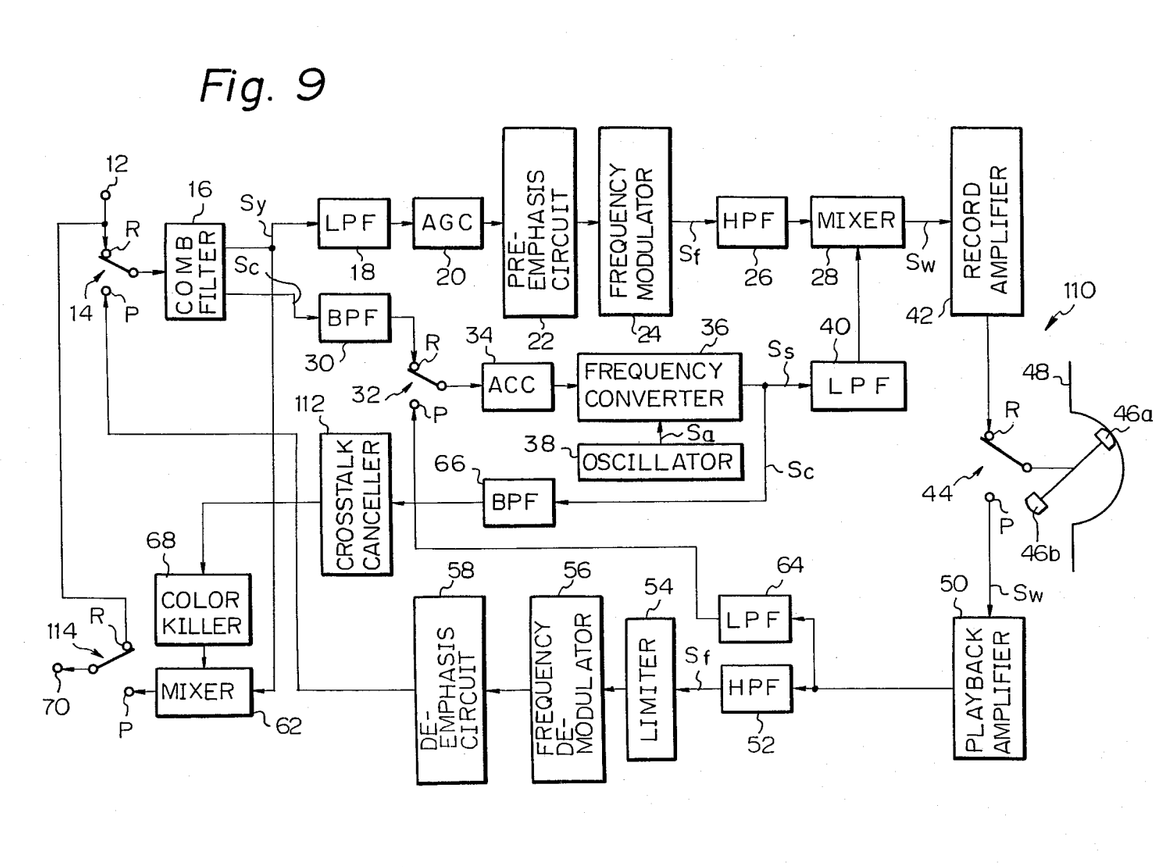
FIG. 9 is a block diagram showing a modification to the apparatus of FIG. 4.

Referring to FIG. 9, a modification to the video signal recording and reproducing apparatus 80 of FIG. 4 is shown and generally designated by the reference numeral 110. A first difference between the apparatus 80 of FIG. 4 and that 110 of FIG. 9 is that in the latter the carrier chrominance signal Sc outputted by the BPF 66 is applied not to the comb filter 16 but to a comb filter 112 which serves as a crosstalk canceller. The advantage of the crosstalk canceller 112 over the comb filter 16 is that its passband needs only to be wide enough to pass only the reproduced and converted carrier chrominance signal. Such a crosstalk canceller is inexpensive. A second difference is that in the apparatus 110 of FIG. 9 the comb filter 22 interposed between the deemphasis circuit 58 and the mixer 62 of FIG. 4 is omitted and its function is fulfilled by the comb filter 16. Although the number of comb filters built in the apparatus 110 is two as in the apparatus 80, one of them, i.e., the comb filter 112 is inexpensive. In FIG. 9, the reference numeral 114 designates a record/playback switch connected to the output terminal 70 and having a record contact R and a playback contact P which are connected to the input terminal 12 and the mixer 62, respectively. The other structural elements which are essentially the same as those of FIG. 4 are designated by like numerals and will not be described any further.

In summary, it wil be seen that the present invention provides a video signal recording and reproducing apparatus which even if a luminance signal component has left unattenuated in the frequency band of a carrier chrominance signal successfully eliminates inteference between a reproduced luminance signal and a reproduced chrominance signal otherwise brought about by the time base fluctuation contained in the luminance signal, thereby allowing the chrominance signal to be adequately interleaved in the luminance signal. This enables the frequency band of a luminance signal to be extended, enhancing high quality recording and playback of video information signals.

Various modifications will become possible for those skilled in the art after receiving the teachings of the present disclosure without departing from the scope thereof.

What is claimed is:

1. An apparatus for recording a video information signal in and reproducing the signal from a magnetic recording medium, comprising:
   video signal recording means comprising means for separating an input video signal into a luminance signal and a carrier chrominance signal, means for frequency modulating the luminance signal, means for converting the chrominance signal to a carrier chrominance signal having a frequency lower than that of the frequency modulated luminance signal, means for combining the frequency modulated luminance signal and said carrier chrominance signal, means for recording the frequency modulated luminance signal and the carrier chrominance signal in a recording medium;
   means for reproducing said frequency modulated luminance signal and carrier chrominance signal from said recording medium, high and low pass filter means for separating the signal reproduced from the recording medium into a reproduced luminance signal and a reproduced chrominance signal, respectively,
   means for frequency demodulating the separated reproduced luminance signal, a comb filter, means applying the output of said demodulating means to said comb filter;
   means for processing said separated reproduced chrominance signal; and
   means for mixing the output of said comb filter and the output of said processing means.
2. The apparatus of claim 1 wherein said comb filter comprises a filter employing the chrominance subcarrier frequency as a reference.

* * * * *